April 17, 1945.                R. N. FEICHT                2,373,671
                                CALCULATOR
                           Filed Oct. 29, 1943

INVENTOR.
ROBERT N. FEICHT
BY
ATTORNEYS

Patented Apr. 17, 1945

2,373,671

UNITED STATES PATENT OFFICE 2,373,671

CALCULATOR

Robert N. Feicht, Dayton, Ohio

Application October 29, 1943, Serial No. 508,272

2 Claims. (Cl. 235—84)

(Granted under the act of March 3, 1883, as amended April 30, 1928; 370 O. G. 757)

The invention described herein may be manufactured and used by or for Government for governmental purposes, without the payment to me of any royalty thereon.

This invention relates to calculators, and more especially to calculators which are designed to facilitate aerial photography.

This art, as presently practiced, involves the taking of a series of photographs by a camera carried on an airplane in flight, the exposures being so timed that the ends of the photographs overlap considerably, that is, objects appearing near the leading end of one, appear again near the trailing end of the next. These separate photographs are then trimmed of the overlap and pieced together in the order taken, with the sections of the same object on adjacent pictures in coincidence.

The time interval required between successive exposures, of course, varies with the ground speed, the altitude, and the overlap desired; and these factors must therefore be determined and properly correlated if a successful photographic map is to be made.

As is well known in the art, weather conditions change rapidly, and unforeseen flying conditions are therefore frequently met, as for instance, the making of a night mosaic may have been contemplated at an altitude of five thousand feet, and proper calculations made therefor before the take-off, only to find, upon arrival at the objective, a ceiling of, say thirty-nine hundred feet.

Since a change in altitude affects many other factors, such for instance, as the length of ground which may be covered at a single exposure, it may become necessary to redetermine the interval between exposures, or the total number of photographs required to cover a given area; or a check on ground speed, after actual altitude and weather conditions are considered on a night flight, may show that the initial calculation for film overlap may preferably be revised in order to insure satisfactory execution of a map, in which case it becomes necessary to make such revised calculations during flight.

It is therefore an object of the invention to provide, in a calculator of this kind, a series of separately movable logarithmic scales specially graduated and arranged to represent the several factors involved in calculations necessary in this art, to the end that present separate reference tables and data, which are not so easily handled during flight, may be eliminated.

More specifically it is an object of the invention to so graduate and arrange a selected series of logarithmic scales that aerial photographic data such as ground speed, altitude, camera lens, focal length, camera plate length, length of ground area photographed, percentage of overlap of successive photographs, etc., may be correlated, and whereby, when several factors are known, others may be found.

Since some of the above factors have a range wherein the maximum is more than ten times the minimum, it follows that the same number on a given scale must represent not only a given quantity, but also ten times that quantity, whereby the location of the decimal point in the result must be determined extraneously.

It is, therefore, another object of the invention to provide a calculator having scales wherein all values of a given factor throughout the range employed have their own position and their own indicia on a single scale, whereby the determination of the decimal point in the result is not required, the true value being read directly from the scale.

Inasmuch as one of the factors employed in the above calculations is usually multiplied by a constant as the last step in the calculation, it is an object of the invention to facilitate manipulation by placing the index of the scale representing this factor at the known constant, then placing the runner line of the calculator directly on an extension of the scale, said runner and scale being then movable only when moved as a unit.

Because of the fact that certain values of a given factor are used in most, although not all of the calculations, two of the scales occupy the same position relative to each other, most although not all of the time, and it is therefore another object of the invention to provide a simple means which is quickly applied or released for securing the two said scales together to move as a unit.

Other objects and advantages will become evident as the invention is further described with reference to the drawing wherein.

Figure 1:
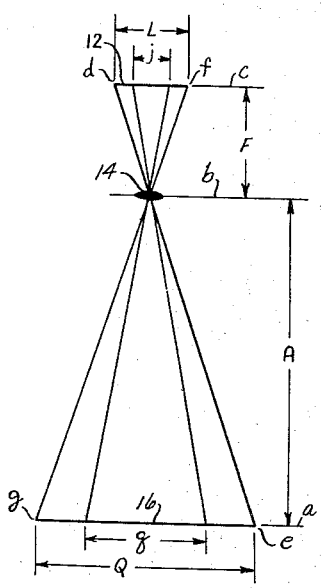
Fig. 1 is a diagram illustrative of the problems involved and facilitated by the use of the improved calculator shown in Figs. 2, 3 and 4.

In the diagram Fig. 1, the letters $a$, $b$, and $c$ represent the relative positions of the ground, lens, and film respectively.

L = the film length in inches.
F = the focal length in inches.
A = the altitude in feet.
Q = the length of ground, in feet, taken in single exposure.
j = any part of the film length less than the whole.
q = any part of the ground covered at one exposure, less than the whole.
S = the ground speed in M. P. H.
G = the percentage of overlap of adjacent films in the complete picture.
i = the interval between exposures in seconds.

With the aid of the diagram, Fig. 1, a selected number of the problems involved in aerial photography may be solved. Since equal angles are included between the lines $d$—$e$ and $f$—$g$ above and below the line drawn through $b$, $AL=FQ$. Similarly $Aj=Fq$.

Problem 1

Find Q (length of terrain photographed at one exposure).
Known:
L (length of film or plate) = 7″.
F (focal length) = 13.5″.
A (altitude) = 2000 ft.
Solved:
$$Q = \frac{LA}{F} = \frac{7 \times 2000}{13.5} = 1037 \text{ ft.}$$

Problem 2

Find q (the ground measurement corresponding to a selected distance $j$ on the film).
Known:
$j = 4.2″$ the selected distance on the film.
F (focal length) = 13.5″.
A (altitude) = 2000 ft.
Solved:
$$q = \frac{jA}{F} = 622 \text{ ft. on ground}$$

Problem 3

Find $i$ (interval in seconds between exposures).
Known:
L (length of film or plate) = 7″.
F (focal length) = 13.5″.
A (altitude) = 2000 ft.
G (end lap in percent of L) = 40%.
S (ground speed) = 120 M. P. H.
Solved:
$j = L - G = 60\% \; L = 4.2″$.

$$q = \frac{jA}{F} = 622 \text{ ft.}$$

$$S = M.P.H. \frac{S}{.682} = \text{ft. per sec.}$$

$$i = \frac{q}{\frac{S}{.682}} = \frac{\frac{jA}{F}}{\frac{S}{.682}} = \frac{.682jA}{FS} = 3.54 \text{ sec.}$$

Problem 4

On a ground glass view finder having a focal length F, an image is observed to move a distance $j$ in $t$ seconds.
Find S (ground speed in M. P. H.).
Known:
F (focal length) = 13.5″.
A (altitude) = 2000 ft.
$j = 4.2″$ movement of image on finder.
$t = 3.54$ sec. required to move 4.2″.
Solved:
$$q = \frac{jA}{F} = 622 \text{ ft. moved in 3.54 sec.}$$

622 ft. in 3.54 sec. = 176 ft. per sec.
176 ft. per sec. × .682 = 120 M. P. H.
S = 120 M. P. H.

Problem 5

On a ground glass view finder having a focal length F, an image is observed to move a distance $j$ in $t$ seconds.
Find A (altitude in feet).
Known:
F (focal length) = 13.5″.
$j = 4.2″$ movement of image on finder.
$t = 3.54$ sec. required to move 4.2″.
S (ground speed) = 120 M. P. H.

$$120 \; M.P.H. = \frac{120}{.682} = 176 \text{ ft. per sec.}$$

Solved:
$$q = 176 \times 3.54 = 622 \text{ ft.}$$

$$A = \frac{qF}{j} = 2000 \text{ ft.}$$

Problem 6

Find A (altitude in feet).
Known:
L (length of plate) = 7″.
F (focal length) = 13.5″.
Q (length terrain on one 7″ plate) = 1037 ft.
Solved:
$$A = \frac{QF}{L} = 2000 \text{ ft.}$$

Problem 7

Find A (altitude in feet).
Known:
F (focal length) = 13.5″.
Scale of photograph—1 = 1777, whereby if L = 7″
Q = 12444″ = 1037 ft.
Solved:
$$A = \frac{QF}{L} = \frac{1037 \times 13.5}{7} = 2000 \text{ ft.}$$

Problem 8

Find A (altitude in feet).

$$\frac{j}{q} \text{(scale of photograph)}$$

Known:
L (length of plate in inches) = 7″.
F (focal length) = 13.5″.
q (length of terrain between exposures) = 6220 ft. = 74,640″.
G (end lap of photographs) = 40%, whereby $j = 60\% \; L = 4.2″$.
Solved:
$$A = \frac{qF}{j} = \frac{6220 \times 13.5}{4.2} = 20,000 \text{ ft.}$$

$$\frac{j}{q} = \frac{4.2}{74640} \text{ or } 1 = 17,770$$

Having now described the problems which arise in practicing the art, the instrument for solving these problems in minimum time will be disclosed.

The device comprises five circular concentric discs having a common axis and a common support 10 whereby the discs are separately rotatable with respect to each other. The discs are laid one upon the other, and progressively decrease in diameter from the lower to the upper disc, thereby leaving exposed an annular margin at the periphery of each disc upon which continuous circular logarithmic scales are graduated.

The exposed margin of the lower disc has two circular scales graduated thereon. The outer one of the two scales is the Q scale, which, in the calculations, represents the feet of terrain covered by an exposure or any known part $q$ thereof, and since this may vary from something over 1000 ft. to somewhere near 100,000 ft., a double logarithmic scale is employed, one part extending through 180 degrees being numbered 1000 to 10,000, and the other part extending through the next 180 degrees being numbered 10,000 to 100,000.

Since this is within the high and low limits of ground covered in current aerial photographic practice, a value falling on this scale will be a whole number, whereby the necessity for determining the decimal point location does not arise. The Q scale progresses anticlockwise around the disc.

The inner one of the two scales on the margin of the lower disc represents either of two of the factors employed in the examples given, first, it may represent L, the inches of film used per exposure or any selected part $j$ thereof, and second, it may represent $i$, the seconds time between successive exposures. Since values of these factors may vary between 1 and 100, the first 180 degrees is graduated from 1 to 10 and the second 180 degrees from 10 to 100. Since values between 1 and 100 embrace alike the values of L and of $i$, indicia on this scale represent whole inches of film length used or whole seconds of time, whereby the position of the decimal point need not be determined. The L and $i$ scale progresses anticlockwise around the disc.

The exposed margin of the second disc bears the F scale, upon which in the calculations the values of F fall, F being the focal length in inches or to be exact, the length in inches between the nodal point of the lens 14 and the focal plane 12 (see Fig. 1). Except that it is of smaller diameter, the F scale is exactly like the L scale, similarly numbered and progressing anticlockwise in the same manner. Since the range of focal lengths F in current aerial photographic practice starts with a value over 1 and under 10 and extends to a value over 10 and below 100, a double logarithmic scale is employed, the first 180 degrees being graduated 1 to 10 and the other 180 degrees 10 to 100. The middle of this scale, i. e., the line represented by the numeral 10 will be considered the index of the scale in describing its manipulation. The F scale also progresses anticlockwise around the disc.

The exposed margin of the third disc bears the A scale upon which, in the calculations, fall the values of A, which is the altitude in feet of the lens 14 above the ground (see Fig. 1). Since the values of A in current aerial photographic practice fall between 1000 and 100,000 ft., a double logarithmic scale is employed, the first 180 degrees of which is numbered 1000 to 10,000 and the second 180 degrees 10,000 to 100,000, the line 10,000 being considered the index and the scale progressing clockwise around the disc.

The outer margin of the fourth disc bears the G scale upon which, in the calculations, is set up the percentage of overlap of successive photographs in the completed picture. The G scale is a logarithmic scale, the graduations of which are based on the mantissas of the numbers one to ten, the graduations progressing clockwise around the disc. The numbers, however, which are placed opposite these graduations, progress anticlockwise around the disc, each being that number found by subtracting the number that should be assigned to a given graduation from one hundred. Thus, where a graduation should ordinarily be numbered 15, it is numbered 100−15=85, or where it should ordinarily be numbered 60, it is numbered 100−60=40. Stated another way, the numbers progress oppositely of the graduations and are shifted so that the number 90 comes opposite the graduation which would ordinarily be marked 10. Thus by directly setting up the film overlap G which is equal to $L-j$, the actual usable film length $j$ is entered directly into the calculation. Since the G or percentage scale may have a range only of 10 to 100, and the previously described scales with which it is to be used are graduated with the mantissas of the numbers 1 to 10 over a span of 180 degrees, the G scale is likewise made to span only 180 degrees. The line numbered 90 on the G scale will be considered its index line.

Inasmuch as, in the calculations, the percentage of end lap on the G scale is set on the index line of the A scale, which is marked 10,000, and inasmuch as 60% of the end lap is used in the calculations more often than any other percentage, it is advantageous to have some means to lock 60 on the G scale at 10,000 on the A scale.

Figure 4:
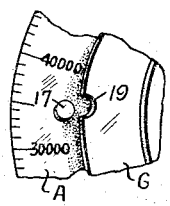
Fig. 4 shows the lock which is provided for securing two adjacent scales together.

Such a locking means must, of course, be of very simple construction and should preferably extend neither above nor below the discs which it locks together. A small disc 17, which should preferably be no thicker, or at least not much thicker, than the fourth disc which bears the G or percentage scale, is provided. The small disc 17 may be a part of the A scale or it may be affixed to the top surface thereof. A semicircular notch 19 to extend around about half the circumference of the disc 17 may then be cut in the edge of the G scale, (see Fig. 4).

The locking disc 17 will normally remain in its notch whereby the A and the G scales will be locked together at 60% overlap, but since the discs are all made of very thin sheet material, a mere flexing of the discs during manipulation of the calculator will spring the small disc 17 out of its notch; whereupon percentages other than 60 may be set against the index of the A scale in the conventional manner.

Around the periphery of the fifth or smallest of the five discs is the S or M. P. H. scale. The graduations of this scale are numbered from 70 to 500 which is within the M. P. H. range within which the art of aerial photography is currently practiced. The graduations progress anticlockwise around the disc, and are so spaced that, were they carried farther to 700, the position of 700 would be spaced 180 degrees from 70.

Inasmuch as, in the calculations herein required, the miles per hour must in all cases be reduced to an equivalent feet per second, which may be done by dividing the M. P. H. by a constant .682, the index line 18 is placed at .682, whereby the M. P. H. factor set up always actually enters the calculation at an equivalent ft. per sec. The logarithmic spacing of the scale, however, begins at 100 where the mantissa of the log is zero.

Inasmuch as, in all of the calculations which the instrument is intended to solve, the runner would be placed at .682 on the S scale, the runner may preferably be fixed to this scale, or, as shown in the drawing, made a part thereof, the hairline 17 of the runner being at the index .682 on the scale.

Figure 2:
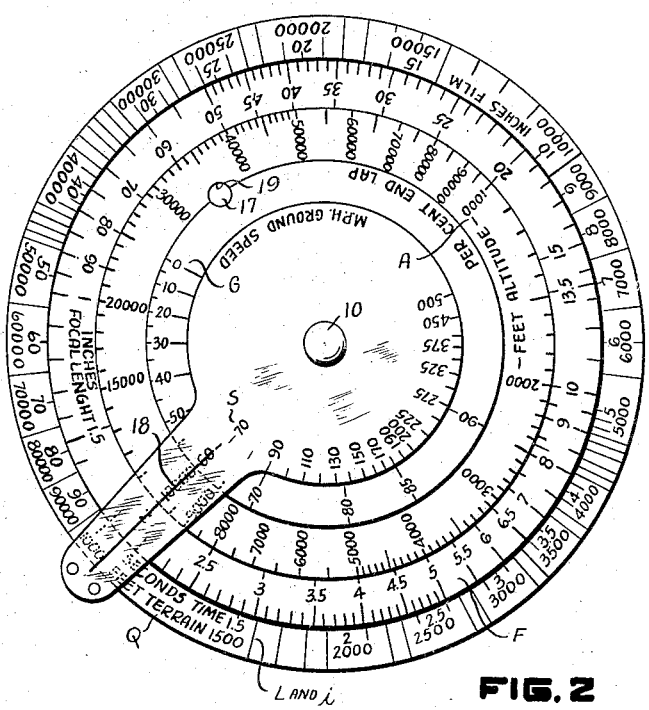
Figs. 2 and 3 show the calculator set up for several different problems.
Figure 3:
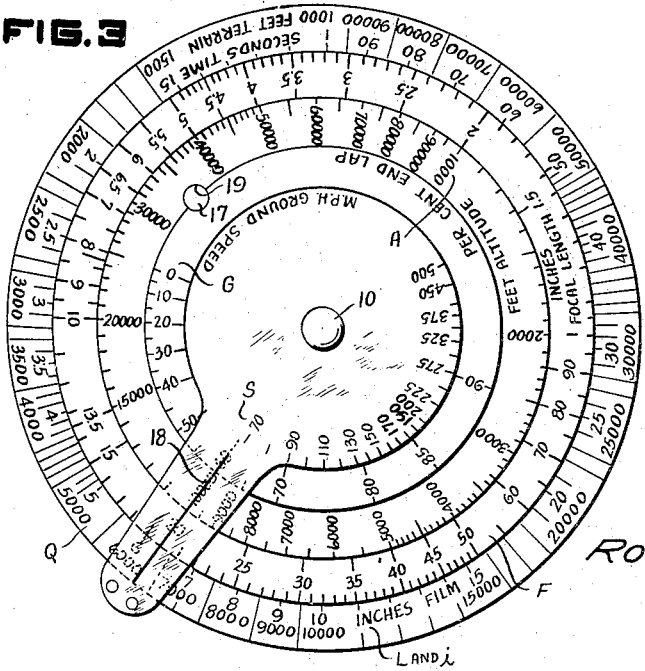

In Figs. 2 and 3 the calculator is shown as being set to the final position required in solving Problems 1 and 2 respectively. Problems 1 through 8 having hereinbefore been solved algebraically, the necessary manipulation will now be described whereby the same problems are solved by the calculator.

Problem 1

To find the length of terrain photographed at one exposure when the film length, 7", the focal length, 13.5", and the altitude of the plane, 2000 ft., are known.

To solve: At 7" on the L scale place 13.5" on the F scale; then at the index on the F scale place 2000 on the A scale; then align the runner with the index of the A scale and read 1037 ft. on the Q scale (see Fig. 2). This will be the length in feet of terrain photographed at each exposure. The G and S scales are not used in this calculation.

Problem 2

To select two spaced-apart objects on a developed film and determine what distance they are actually spaced on the ground, the focal length, 13.5", and the altitude, 20,000 ft., being known. Assume the two points selected on the developed film are 4.2" apart by measurement.

To solve: At 4.2" on the L scale, place 13.5" on the F scale; then at the index on the F scale place 20,000 on the A scale; then align the runner with the index of the A scale and read 6220 on the Q scale (see Fig. 3). This will be the distance in feet that the objects selected on the developed film are spaced apart on the ground. The G and S scales are not used in this calculation.

Problem 3

To find the interval in seconds at which successive exposures should be made, when the film length, 7", the focal length, 13.5", and the altitude, 2000 ft., are known; the end lap, which successive developed films are to have, has been set at 40%; and a ground speed of 120 M. P. H. has been decided on.

To solve: At 7 on the L scale, place 13.5 on the F scale; at the index on the F scale place 2000 on the A scale; at the index on the A scale place 40 on the G scale; at the index of the G scale place 120 on the S scale; then on the hairline of the runner read 3.54 on the t scale. This will be the time interval in seconds which should be left between successive exposures.

Problem 4

To find the ground speed in M. P. H. at which the plane is traveling by timing the relative movement of an object on the ground over a measured distance on the view finder, when the focal length, 13.5", and the altitude, 2000 ft., are known; the distance over which the object had moved on the view finder has been measured and found to be 4.2", and the time consumed in moving the 4.2" was 3.54 seconds.

To solve: At 4.2 on the L scale place 13.5 on the F scale; at 10 on the F scale place 2000 on the A scale; at 10,000 on the A scale place 0 on the G scale; bring runner hairline to 3.54 on the t scale; at 90 on the G scale read 120 M. P. H. on the S scale.

Problem 5

To find the altitude, in feet, of an airplane by timing the relative movement of an object on the ground over a measured distance on the view finder, when the focal length, 13.5", and the ground speed, 120 M. P. H., are known; the distance over which the object has moved on the view finder has been measured and found to be 4.2"; and the time consumed in moving the 4.2" was 3.54 seconds.

To solve: At 4.2 on the L scale place 13.5 on the F scale; at 10,000 on the A scale place 0 on the G scale; at 90 on the G scale place 120 on the S scale; move three inner discs as a unit until the runner hairline is at 3.54 on the t scale; at 10 on the F scale read 2000 ft. altitude.

Problem 6

To find the altitude in feet of an airplane when it is known that the terrain photographed on a single plate or film of 7" length is 1037 ft. when the focal length is 13.5".

To solve: At 7" on the L scale place 13.5 on the F scale, bring runner to 1037 ft. on the Q scale; bring index of A scale to the runner; at index of F scale read 2000 ft. altitude on the A scale (see Fig. 2). It is noted that Fig. 2 of the drawing shows the final setting for Problem 6 as well as for Problem 1.

Problem 7

To find the altitude in feet when the length of a plate is known to be 7", the focal length, 13.5", and the scale of the photograph, 1 to 1777.

To solve: 1 ft. or 12" of plate length corresponds to 1777 ft. ground length. At 12" on the L scale place 13.5 on the F scale; bring runner to 1777 on Q scale; bring index of A scale to runner; read 2000 ft. altitude on A scale opposite index on F scale.

Problem 8

To find the altitude in feet and the scale of the photograph when the plate or film length is known to be 7", the focal length, 13.5", the end lap, 40%, and the length of the terrain taken at one exposure exclusive of the overlap, 6220 ft.

To solve: With runner hairline, align 0 on G scale with 6220 on Q scale; move hairline to 40 on the G scale: read 10,370 at hairline on Q scale.

At 7 on the L scale place 13.5 on the F scale; align 10,000 on the A scale with 10,370 on the Q scale; at 10 on F scale read 20,000 ft. on the A scale.

At 12 on the L scale place 13.5 on the F scale; at 10 on the F scale place 20,000 on the A scale; at 10,000 on the A scale read 17,770 on the Q scale. The scale of the photograph is therefore 1 to 17,770.

From the foregoing description, it will be evident that employment of the device described for the purpose set forth saves much time and greatly simplifies the calculations involved, thus avoiding many errors. These advantages are had by the novel arrangement of scales, wherein most of the scales are made double in order to cover the full range of the values of the factors represented, whereby the difficulty of locating the decimal point in the result is avoided. The means for locking the percentage scale to the altitude scale at the most used percentage is also a novel idea. Permanently locating the hairline of the runner at .682 on the S scale, the constant for converting miles per hour to feet per second, is also a valuable feature.

Having described an embodiment of my invention I claim:

1. A calculator comprising a plurality of superimposed discs of relatively thin flexible sheet material, means to support said discs for relative rotation about a common axis, each succeeding disc being of smaller diameter than the one beneath it, thereby leaving a peripheral margin on one disc extending from beneath the disc above it, said margins and the margin of the upper disc being provided with a series of scales, the uppermost disc being provided with an integral runner arm which extends radially across the scales of the other discs and carries a radially extending runner hairline, whereby the upper scale and the runner hairline always move together, and a locking device which comprises a notch in one disc and a projection extending from the face of the adjacent disc, said projection being normally in said notch whereby the two discs rotate in unison, but adapted to be withdrawn from said notch by slight opposite flexure of the two discs to slightly separate their interfacing surfaces, whereby the two discs may rotate separately.

2. A calculator comprising a plurality of superimposed discs of relatively thin flexible sheet material, means to support said discs for relative rotation about a common axis, each succeeding disc being of smaller diameter than the one beneath it, thereby leaving a peripheral margin of one disc extending from beneath the disc above it, said margins and the margin of the upper disc being provided with a series of scales, and a locking device for at least one pair of the discs which comprises a notch in one disc and a projection extending from the face of the adjacent disc, said projection being normally in said notch, whereby the two discs rotate in unison, but adapted, by slightly flexing the two discs so as to slightly separate their interfacing surfaces, to be withdrawn from said notch, whereby the two discs may rotate independently.

ROBERT N. FEICHT.